United States Patent [19]

Fergeson

[11] 3,992,696

[45] Nov. 16, 1976

[54] SELF-CHECKING READ AND WRITE CIRCUIT

[75] Inventor: Allen Dennis Fergeson, Columbus, Ohio

[73] Assignee: Bell Telephone Laboratories, Incorporated, Murray Hill, N.J.

[22] Filed: June 27, 1975

[21] Appl. No.: 591,140

[52] U.S. Cl. .................. 340/146.1 AG; 235/153 AC

[51] Int. Cl.$^2$ .......................................... G06F 11/00

[58] Field of Search ......... 340/146.1 AG, 146.1 AB; 235/153 AC, 153 AM

[56] References Cited

UNITED STATES PATENTS

| | | | |
|---|---|---|---|
| 3,401,379 | 9/1968 | Prell et al. | 235/153 AC |
| 3,428,945 | 2/1969 | Toy | 340/146.1 AB |
| 3,465,132 | 9/1969 | Crockett et al. | 340/146.1 AG |
| 3,541,507 | 11/1970 | Duke | 340/146.1 AB |

OTHER PUBLICATIONS

Sellers et al., Error Detection Logic for Digital Computers, McGraw–Hill, 1968, pp. 212–217.

*Primary Examiner*—Charles E. Atkinson
*Attorney, Agent, or Firm*—Frederick W. Padden; Paul E. Kudirka

[57] ABSTRACT

A self-checking read and write circuit interfaces a control circuit with a plurality of peripheral circuits. The read and write circuit receives address and data commands from the control circuit, decodes the commands and produces a driving signal to operate relays in the peripheral circuits. The read and write circuit also receives inputs from the peripheral circuits indicating the state thereof, multiplexes and inputs and forwards them to the control circuit under control of address signals. The circuit is self-checking in that a readout multiplexor which scans for state changes in the peripheral circuits has its even parity inputs connected at the outputs of the drive signal decoder and its odd parity inputs connected to the scanned points. A parity check circuit on the multiplexor address leads determines whether the address has even or odd parity. If the parity is even, the output of the multiplexor is compared to the output of the drive signal decoder. If the parity on the address leads is odd, the output of the multiplexor is forwarded to the processor. A single hardware failure in the multiplexor address circuitry causes a failure in one of several modes involving a shift in parity values. These failure modes are detected when the output of the multiplexor is compared to the output of the drive signal decoder.

10 Claims, 2 Drawing Figures

SELF-CHECKING READ AND WRITE CIRCUIT

BACKGROUND OF THE INVENTION

1. Field of the Invention

This invention relates to circuits for interfacing centralized control circuits with a plurality of peripheral circuits and in particular to those interface circuits which contain error check circuitry for detecting internal circuit faults.

2. Description of the Prior Art

In many real time systems, it is necessary that a number of peripheral circuits operate under control of a centralized control circuit which is often a stored program processing unit. One method of controlling the peripheral circuits is to connect each peripheral circuit directly to the central control. When the number of peripheral circuits becomes large, a direct connection scheme is often impractical and it becomes necessary to perform time division multiplexing on the outgoing command signals and incoming data in order to efficiently use the capabilities of the central control.

The job of multiplexing incoming data and decoding outgoing control circuits may be performed by an interfacing read and write circuit. The central control provides the interface circuit with an address which uniquely identifies one of the peripheral circuits. If the control circuit wishes to perform some operation on a peripheral circuit, a data command is also forwarded to the interface circuit. The interface circuit utilizes the address and data provided to develop a signal which is then forwarded to the identified peripheral unit. Similarly, if the central control desires to interrogate a peripheral unit to determine its state, it provides an address code and a read command to the interface circuit which then causes the identified peripheral unit to be temporarily connected to the central control information bus. Interface units such as that described above are well known in the computer and telecommunications switching art.

However, when an interface unit is placed between control and peripheral circuits, the system reliability is reduced since the interface unit is itself subject to internal circuit failures. In order to increase reliability, it has become standard practice to perform maintenance operations on the interface unit to detect internal failures.

In the prior art, in order to perform a maintenance check, for example, on the readout multiplexor which reads the states of the peripheral units and forwards them to the control circuit, the inputs to the mulitplexor were disconnected from the peripheral units and connected to a source of data whose states were known. The multiplexor then was cycled through all of its states and the output was compared to the known data input to detect internal failures. This method of checking for circuit failures was effective in that all internal circuitry of the multiplexor could be checked. However, it required the normal operation of the circuit to be halted while the maintenance operation was being performed. It is thus desirable to have a read and write circuit which can perform a maintenance check for internal circuit failures while the circuit is in operation.

Accordingly, it is an object of the present invention to provide a self-checking read and write circuit which automatically performs maintenance checks for internal circuit failures without halting the operation of the circuit.

It is a further object of the present invention to provide a read and write circuit with a self-checking feature which does not require extensive circuitry for the maintenance operation.

SUMMARY OF THE INVENTION

The foregoing and other objects are achieved in accordance with the principles of the present invention in one illustrative embodiment thereof wherein a self-checking read and write circuit interfaces a central control circuit with a plurality of peripheral units. The read and write circuit includes a drive signal decoder which receives address and data commands from the central control and produces a drive signal to operate relays in the peripheral circuits. The circuit also contains a readout multiplexor which receives inputs from the peripheral circuits and forwards these inputs to the processor under control of address signals. The self-checking feature is implemented by connecting multiplexer inputs which correspond to even parity numbers to the outputs of the drive signal decoder. The multiplexor inputs corresponding to odd parity numbers are connected to the scanned inputs from the peripheral units. The outputs of the drive decoder are "known" since they are determined by address and data signals received from the central control, whereas the states of the scanned points are "unknown" since they depend upon the states of the peripheral units. Thus, when an address with even parity is provided to the multiplexor, an input connected to the drive signal decoder, or a known input, is connected to the output of the multiplexor. Advantageously, the known signal may be a drive signal which is used during a write operation to control a peripheral circuit. When an odd parity address is provided to the multiplexor, an unknown scanned input appears at the output of the multiplexor. A parity check circuit on the multiplexor address leads detects whether the received address has odd or even parity. If the detected parity is even, the output of the multiplexor is compared to the known data input and thus a maintenance check is performed. A single hardware failure in the multiplexor address circuitry causes a failure in one of three modes: when some of the possible address codes appear at the multiplexer address inputs (a) both an even parity and odd parity input are simultaneously connected to the output; (b) an odd parity input is substituted for an even parity input; or (c) no signal appears at the output. Continued comparison of the output of the multiplexor to the known data input will produce a mismatch if the circuit is in one of the three failure modes. The mismatch indicates a multiplexor circuit failure.

If the parity check circuit on the address leads detects an odd parity address, the output of the mulitplexor is forwarded to the processor for operation in the normal mode. Thus, if all of the address states are cycled through the multiplexor during the normal course of circuit operation, maintenance checks will be interleaved with normal scanning operations and the circuit will perform error checks on its own circuitry while in operation. In particular, a maintenance error check may be performed each time the circuit performs a write operation.

DETAILED DESCRIPTION

Figure 1:
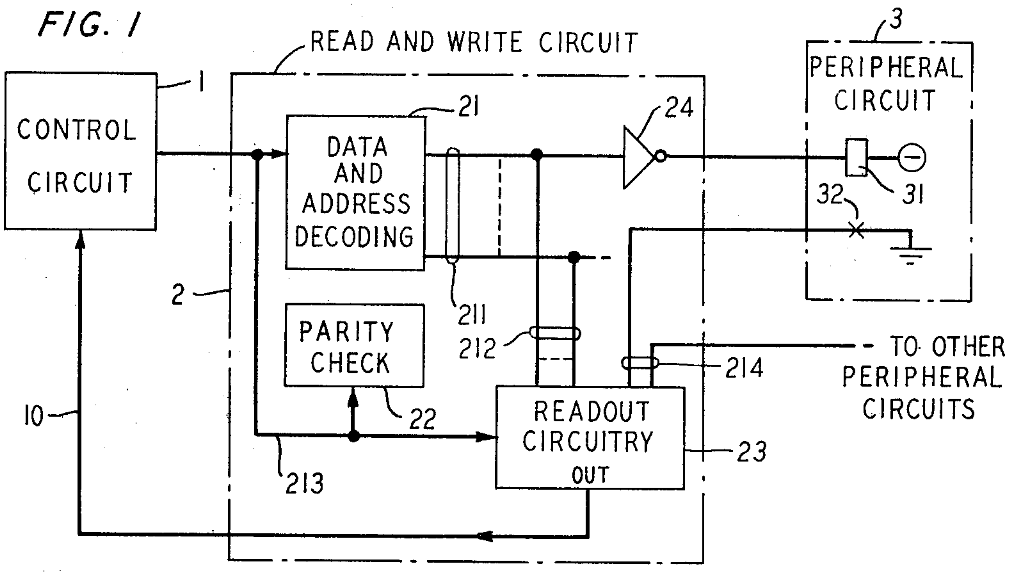
FIG. 1 is a block diagram of the self-checking read and write circuit interfacing a control circuit with an illustrative peripheral circuit.

FIG. 1 of the drawing shows a typical control system in which control circuit 1 operates on and receives information from a plurality of peripheral circuits, of which only peripheral circuit 3 is shown. Control circuit 1 is interfaced with peripheral circuit 3 by read and write circuit 2, which in turn controls peripheral circuit 3 by means of relays, such as relay 31, in peripheral circuit 3. Relay 31 is operated by commands developed by read and write circuit 2 operating under control of control circuit 1. Specifically, control circuit 1 provides data and address signals to data and address decoding unit 21. Responsive to incoming signals, decoding unit 21 produces a signal on one of its output leads 211. Each of output leads 211 is connected via a driver, such as driver 24, to a single relay, such as relay 31.

In addition, control circuit 1 receives state information from peripheral circuit 3 by means of contact 32 which is opened and closed under control of supervisory circuits (not shown) in circuit 3. The state of contact 32 is scanned by readout circuitry 23 under control of address and read command signals provided by control circuit 1. The states of the contacts in the peripheral circuits are multiplexed on control circuit information bus 10 in order to be forwarded to control circuit 1.

Advantageously, read and write circuit 2 is designed to be self-checking for internal circuit component failures in address decoding circuitry 21 and readout circuitry 23. The self-checking feature is implemented by connecting outputs 211 of decoding unit 21 to the inputs of readout circuitry 23 by means of leads (of which only lead 212 are shown) in a manner hereinafter described. In addition, parity check circuit 22 is provided to determine the parity on address leads 213 and control the forwarding of information to control circuit 1 via bus 10 as will be hereinafter described.

Figure 2:
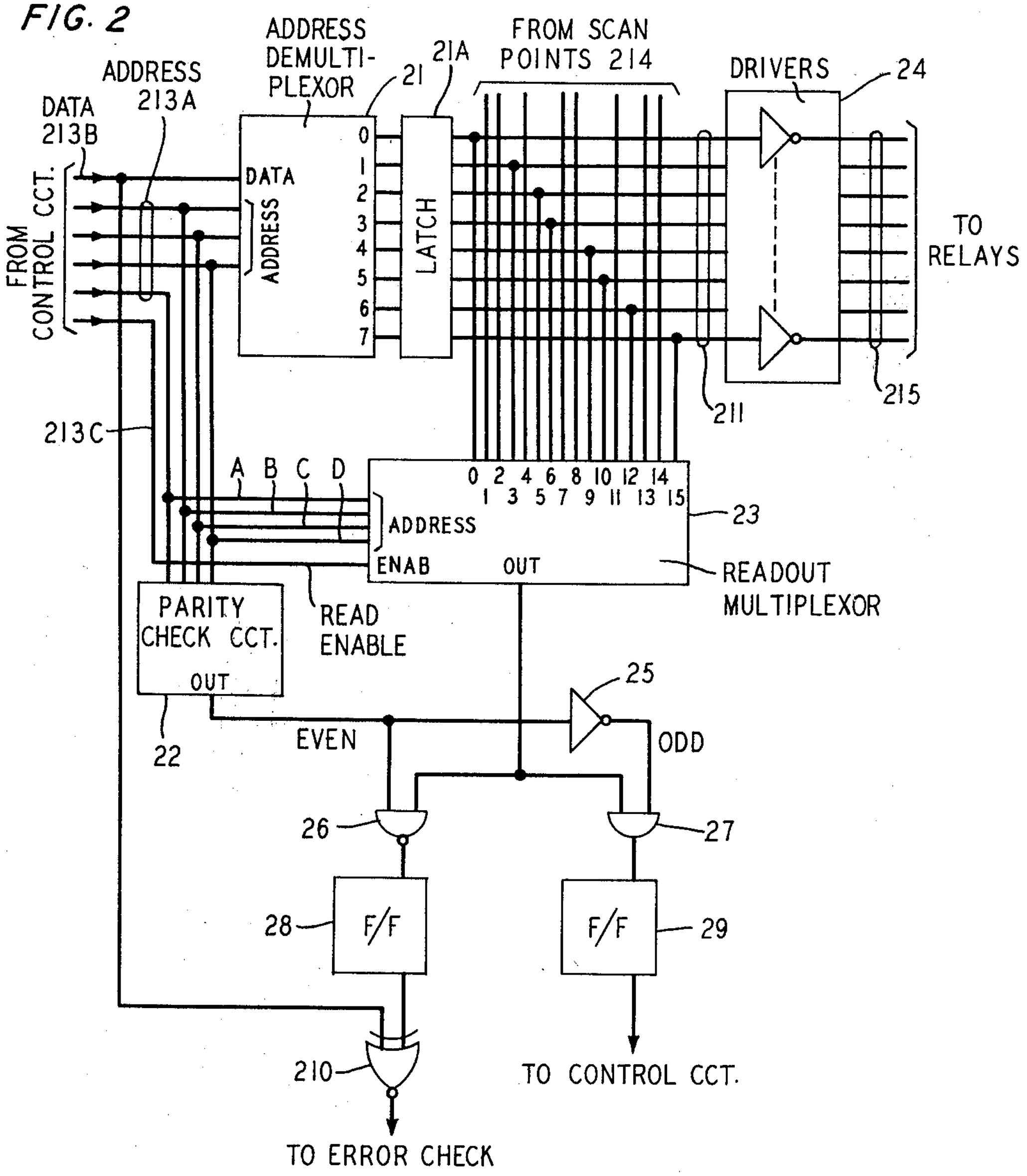
FIG. 2 is a schematic diagram of the interface circuit shown in block form in FIG. 1.

FIG. 2 shows the circuitry of read and write circuit 2 in greater detail. Read and write circuit 2 receives commands from control circuit 1 on leads 213A, 213B, and 213C. These commands are used to control address demultiplexor 21 and readout multiplexor 23. Demultiplexor 21 is a circuit of well-known design which has a data input and a plurality of outputs that are selectable under control of address signals appearing at the address inputs. When a binary address signal appears at the address inputs of demultiplexor 21 the output numbered with the corresponding decimal number is selected. The operation and circuitry for an illustrative example of demultiplexor 21 is given in *The TTL Data Book for Design Engineers*, Texas Instruments, Inc. 1st Edition, 1973, p. 308 (T. I. No. SN74154).

Readout multiplexor 23 is a well-known circuit similar to demultiplexor 21. Multiplexor 23 has a plurality of inputs selectively connectable to a single output under control of address signals appearing at the address inputs. One of the decimal numbered inputs is selected when the corresponding binary number appears on the address inputs. The signal appearing at the selected input is produced inverted at the output when a high signal is placed on the read enable lead. The circuitry and operation for an illustrative example of a multiplexor such as multiplexor 23 is disclosed in *The TTL Data Book for Design Engineers*, Texas Instruments, Inc. 1st Edition, 1973, p. 294 (T.I. No. 74150). Demultiplexor 21 in turn controls the states of latch 21A. The outputs of latch 21A operate relays in the peripheral circuits (not shown in FIG. 2) as described above by means of drivers 24.

Advantageously, the outputs of latch 21A are also connected to the inputs of a readout multiplexor 23. As will be hereinafter explained in detail, the connections allow the circuit to be self-checking by providing a set of known inputs which are used to check the address circuitry in readout multiplexor 23 during the circuit operation. Specifically, outputs 211 of latch 21A are connected to inputs of mulitplexor 23 which correspond to binary numbers having even parity. Thus, outputs 211 of latch 21A are connected to multiplexor inputs 0, 3, 5, 6, 9, 10, 12, and 15. The other inputs of multiplexor 23 are connected to scan points (not shown in FIG. 2) by means of leads 214.

In particular, the read and write circuit shown in FIG. 2 also interfaces with the peripheral circuits by means of scan leads 214 and outputs 215 of drivers 24. Scan leads 214 convey information from the peripheral circuits (such as circuit 3 in FIG. 1) to readout multiplexor 23 in order to be forwarded to the central control under control of address signals appearing on address leads 213A. Leads 214 are connected to multiplexor inputs corresponding to binary numbers with odd parity, that is, numbers 1, 2, 4, 7, 8, 11, 13, and 14. This connection arrangement is necessary to permit the self-checking feature of the read-write circuit to operate without disconnecting the scanning leads as will be hereinafter described.

Read and write circuit 2 also provides control circuit 1 with error check information and information concerning the state of the peripheral circuits. In particular, the output of readout multiplexor 23 is connected to AND gates 26 and 27 which are in turn controlled by parity check circuit 22 and inverter 25 in order to switch the output between error check circuits (not shown) and information bus 10 connected to central control 1. Signals appearing at the outputs of AND gates 26 and 27 are temporarily stored in flip-flops 28 and 29, respectively. The output of flip-flop 28 is compared to data input 213B by means of exclusive OR gate 210. The comparison signal developed by OR gate 210 is used to indicate a failure in the internal circuitry of the read and write circuit as will be hereinafter explained. Thus, the output of OR gate 210 is forwarded to error check monitor circuits (not shown) which may be located in the central control. Similarly, signals appearing at the output of AND gate 27 are stored in flip-flop 29 preparatory to sending the signals to central control 1.

The operation of my illustrative read and write circuit shown in FIG. 2 may be more thoroughly understood by following a description of the circuit operation in each of the three functional modes — the write mode, the read mode, and the error check mode.

WRITE OPERATION

In order to initiate a write operation, control circuit 1 places the address of a peripheral circuit which is to be controlled on address leads 213A. Since there are only eight circuits shown in FIG. 2, an address signal is placed on leads B, C, and D, of leads 213A. Lead A, which is used for the error check and readout modes, is not utilized for the write operation. In addition, control circuit 1 places the data to be written into the peripheral circuit on lead 213B. Responsive to the data and address signals appearing on leads 213B and 213A, address demultiplexor 21 places a signal corresponding to the data signal on one of its output leads 0–7. The signal is stored in latch 21A and is forwarded via the appropriate one of drivers 24 to the selected relay in one of the peripheral circuits by means of leads 215.

READ OPERATION

In order to initiate a read operation, control circuit 1 places appropriate address signals on address leads 213A. The address for selecting an appropriate contact to be read is placed on leads B, C, and D of address leads 213A. The signal on lead A is selected and controlled by control circuit 1 so that the parity over all of address leads 213A is odd. As will hereinafter be described, an odd parity address signal results in a read operation in which the scanned signal is forwarded to the control circuit, whereas an even parity signal places the circuit in the error check mode.

In addition, control circuit 1 places a high signal on read enable lead 213C, which high signal enables readout multiplexor 23 to connect one of its inputs (inverted) to its output. Since the address signals appearing on leads 213A have odd parity for a readout operation, the selected input of inputs 0–15 of readout multiplexor 23, will correspond to binary number having odd parity. Therefore, one of input leads numbered 1, 2, 4, 7, 8, 11, 13, or 14 will be selected by the address signals on lead 213A. These multiplexor inputs are connected by leads 214 to contacts (such as contact 32 in FIG. 1) in the peripheral circuits. Thus, a signal indicating the state of the selected scan contact will appear at the output of readout multiplexor 23. This signal is forwarded to the inputs of NAND gate 26 and AND gate 27.

NAND gate 26 and AND gate 27 are in turn controlled by parity check circuit 22. Parity check circuit 22 responds to odd parity signals on address leads 213A by placing a low signal on its output. The low signal on the output of parity check circuit 22 disables NAND gate 26, preventing an error check comparison. In addition, the low signal produced by parity check circuit 22 is inverted by inverter 25 and applied as a high signal to enable AND gate 27. Enabled AND gate 27 forwards the signal appearing at the output of readout multiplexor 23 to flip-flop 29. Flip-flop 29 stores the output signal of readout multiplexor 23 in preparation for forwarding the signal to control circuit 1 via information bus 10 (FIG. 1).

ERROR CHECK OPERATION

The operation of read and write circuit 2 in the error check mode is similar to its operation in the readout mode. However, to place the circuit in the error check mode, control circuit 1 places address signals on leads 213A and controls lead A in particular so that the parity of the address signals is even. Responsive to even parity address signals appearing at its address inputs, readout multiplexor 23 connects one of its inputs corresponding to an even parity number (inputs 0, 3, 5, 6, 9, 10, 12, and 15) to its output. As shown in FIG. 2, the even parity inputs of readout multiplexor 23 are connected to the outputs of latch 21A. Latch 21A also simultaneously receives signals from address demultiplexor 21 which in turn is controlled by the address signals on leads 213A. In response to data and address signals at its inputs, demultiplexor 21 selects one of its outputs and produces a signal on its selected output in accordance with the data signal appearing on lead 213B. The outputs of demultiplexor 21 are connected via latch 21A to the inputs of readout multiplexor 23 so that the signal produced in response to address and data signals by demultiplexor 21 is connected to that input of readout multiplexor 23 which is selected by address signals appearing on lead 213A.

In particular, leads B, C, and D of address leads 213A are connected to address demultiplexor 21, whereas leads A, B, C, and D of address leads 213A are connected to readout multiplexor 23. In addition, the internal address circuitry of readout multiplexor 23 is arranged so that lead A of leads 213A corresponds to the least significant digit of the binary address and lead D corresponds to the most significant digit. This arrangement assures that the selected output of demultiplexor 21 corresponds to the selected input of multiplexor 23. For example, assume the binary address 010 is placed on leads D, C, B, respectively, by control circuit 1. This corresponds to a decimal number 2 and thus demultiplexor 21 selects its output lead 2 and places thereon the data signal appearing on lead 213B. In order to place the read and write circuit in the error check mode, the parity over all of leads A, B, C, and D must be even as described previously. Thus, control circuit 1 must place a 1 on lead A. When the binary address 0101 is presented to multiplexor 23 on leads D, C, B, and A of leads 213A, respectively, it selects its input 5 which is the corresponding decimal number. Output 2 of demultiplexor 21 is connected to input 5 of multiplexor 23. Therefore, the data signal appearing on lead 213B is connected through demultiplexor 21, latch 21A, and readout multiplexor 23 to the output of readout multiplexor 23. Similar connections are made for all other binary addresses.

The data signal appearing at the output of multiplexor 23 is applied to AND gates 26 and 27 which are in turn controlled by parity check 22. Parity check circuit 22 places a high on its output responsive to even parity address signals appearing on leads 213A. This high signal is inverted by inverter 25 and applied as a low signal to disable AND gate 27, preventing the output of readout multiplexor 23 from being forwarded to control circuit 1. The high signal at the output of parity check circuit 22 enables NAND gate 26, which enabled gate forwards the output of readout multiplexor 23 to flip-flop 28. Flip-flop 28 stores the signal at the output of readout multiplexor 23 and forwards the signal to one input of exclusive NOR gate 210. The other input of exclusive NOR gate 210 is connected to data input lead 213B. Thus, if the read circuitry and in particular, readout multiplexor 23, is operating properly, both signals to the inputs of exclusive NOR gate 210 will be the same. Responsive to the same signals at each of its outputs, exclusive NOR gate 210 produces a high signal, which signal is forwarded to control circuit 1 to indicate proper circuit operation of read and write circuit 2. If, however, a circuit fault develops in demultiplexor 21 or latch 21A, an improper signal will appear at the output of readout multiplexor 23 resulting in the inputs to exclusive NOR gate 210 being different signals. This condition results in exclusive NOR gate 210 producing a low signal, which signal is forwarded to control circuit 1 to indicate an error condition.

Advantageously, in addition to checking the internal circuitry of demultiplexor 21 and latch 21A, my illustrative read and write circuit is adapted to perform an error check for single component failures on the internal address circuitry of readout multiplexor 23 during a write operation of the circuit. In particular, as will hereinafter be described, a failure in the address circuitry of readout multiplexor 23 will result in the multiplexor circuit entering one of three failure modes:

a. when a particular address appears at the address inputs, two input leads corresponding to even and odd parity numbers will be ORed together at the output;

b. when a particular address appears at the address output, no signal will appear at the output; or c. when a particular address appears at the address inputs an input corresponding to a number of one parity will be selected instead of an input corresponding to a number of opposite parity.

For example, one particular illustrative multiplexor circuit which may advantageously be used in accordance with my invention consists of a plurality of signal gates, one of which corresponds to each input to the multiplexor. Each of the signal gates receives an input from the read enable lead and an input from the corresponding multiplexor input. The signal gates further receive inputs from the address decoding circuitry, which consists of inverters and buffers that operate on the address signal. The address decoding circuitry is wired to the signal gates in a decoding network. Therefore, when address signals and a read enable signal is present, one signal gate has all of its inputs enabled and the signal at the corresponding multiplexor input is passed through the enabled gate. All of the signal gates have their outputs ORed together and thus, the output of the enabled signal gate is forwarded to the output of the multiplexor. Through straightforward circuit analysis and other techniques well known to those skilled in the art, it can be shown that if one of the inverters in the address decoding circuitry fails, the result is that signal gates are enabled which are not enabled when the multiplexor circuit is operating properly. In particular, when certain of the possible address codes appear at the address inputs, two signal gates may be enabled, no signal gate may be enabled, or a gate different from the normal gate may be enabled. Furthermore, straightforward circuit analysis shows that gates corresponding to inputs of opposite parity are involved, leading to the three failure modes discussed above.

In my illustrative embodiment even parity inputs are connected to the outputs of demultiplexor 21 via latch 21A, and thus the signals appearing at these inputs are known since they are determined by signals on leads 213A and 213B, which signals may be generated by control circuit 1 during a write operation. Signals appearing at odd parity inputs of readout multiplexor 23 are unknown since they are determined by the states of scan contacts in the peripheral circuits. Thus, a failure in the address circuitry of readout multiplexor 23 will cause a known and unknown signal to be ORed together at the output of readout multiplexor 23, an unknown signal to be substituted for a known signal or no signal at all to appear at the output of readout multiplexor 23. It is apparent that when the output of readout multiplexor 23 is compared to the data input on lead 213B, as previously described in the error check mode, the presence of an unknown signal during a failure condition will eventually result for certain address codes, in a mismatch at exclusive NOR gate 210 and in an error being detected.

To insure that all of the possible circuit faults will be detected, it is necessary to cycle through all of the possible address codes. This may conveniently be done by providing a counter at control circuit 1. In this case read operations would be interleaved with error checks according to the parity of the address. It would, of course be within the skill of the art to devise other patterns of address codes to cause error checks to be performed more or less frequently.

Other modifications to my illustrative circuit may also be made within the spirit and scope of my invention by those skilled in the art. For example, the error check control circuitry consisting of parity check circuit 22, inverter 25, gates 26 and 27, flip-flops 28 and 29 and NOR gate 210 may be conveniently located in control circuit 1. Parity check circuit 22 may be illustratively combined with the address generator circuit in control circuit 1 and other straightforward modifications may be made.

Also, the outputs of latch 21A may be connected to the odd inputs of readout multiplexor 23 with appropriate changes in the scan point connections and error check control circuitry without departing from the scope of my invention. A further modification within the scope of my invention is to modify the sequence of circuit operations. For example, as discussed above the write and error check operations may be performed simultaneously. However, it will be apparent to those skilled in the art that an error check operation may also be performed by causing an error check readout of known data which was stored in latch 21A by a previous write operation. In some circuit applications this sequential operation is desirable since it will detect a fault in demultiplexor 21 which causes two outputs to be selected simultaneously.

What is claimed is:

1. An arrangement for detecting faults in a multiplexor having an output and a plurality of inputs separable into an even parity group including inputs corresponding to binary numbers having even parity and an odd parity group including inputs corresponding to binary numbers having odd parity, and further having means for generating a signal on said output in response to received address signals and data signals appearing at said plurality of inputs said arrangement comprising:

a source for generating known data inputs connected to one of said parity groups;

means for detecting the parity of said received address signals; and means cooperating with said detecting means and responsive to a data input generated by said source for comparing said generated data input to the signal on said multiplexor output when said address signals have the same parity as said one of said parity group.

2. An arrangement for detecting faults in a multiplexor according to claim 1 wherein said source comprises a data source lead and a demultiplexor having an input connected to said lead for receiving a data signal and a plurality of outputs connected to multiplexor inputs in said one of said parity groups.

3. Self-checking circuitry for reading the state of a plurality of scannable elements and for actuating a plurality of controlled devices in response to a receipt of data and address signals from a control circuit, said circuitry comprising:

a multiplexor having a plurality of inputs separable into an even parity group including inputs corresponding to binary numbers having even parity and an odd parity group including inputs corresponding to binary numbers having odd parity, said inputs being selectively connectable to an output in response to said address signals;

means connected to one of said multiplexor input groups and being responsive to said received data and address signals for generating drive signals to actuate one of said plurality of devices;

means connecting the other of said multiplexor input groups to said scannable elements;

a parity checker responsive to said received address signals for detecting the parity thereof; and means cooperating with said parity checker and responsive to said received data signal for comparing the output of said multiplexor to said received data signal when said received address signals have the same parity as said one of said multiplexor input groups.

4. A self-checking circuit according to claim 3 further comprising means cooperating with said parity checker for reading out the signal on said multiplexor output to said control circuit when said received address signals have the same parity as said other of said multiplexor input groups.

5. A self-checking circuit according to claim 4 wherein said drive signal generating means comprises a demultiplexor having an input for receiving said data signals and a plurality of outputs connected to said multiplexor inputs, said multiplexor outputs being selectively connectable to said demultiplexor input under control of said received address signals.

6. A self-checking circuit for reading the state of a plurality of scannable contacts and for actuating a plurality of control devices in response to binary address and data signals received from a control system, said circuit comprising:

means responsive to said received data and address signals for generating drive signals to actuate one of said plurality of devices;

a readout multiplexor having a plurality of inputs and an output, each of said inputs being selectively connectable to said output under control of said received address signals, said inputs corresponding to received address signals having odd parity being connected to said scannable contacts and said inputs corresponding to received address signals having even parity being connected to said generating means to receive said drive signals;

a parity checker responsive to said received address signals for detecting the parity thereof;

a comparator having a first input for receiving said data signals and a second input;

means responsive to the detection of even parity address signals by said checker for gating the signal on said multiplexor output into said second comparator input; and means responsive to the detection of odd parity address signals by said checker for gating the signal on said multiplexor output to said conrol system.

7. In combination, a plurality of peripheral circuits capable of performing first and second functions and having input and output leads;

a control circuit for supplying address and control signals for selecting a particular one of said peripheral circuits and one of said functions;

an addressable demultiplexor having an input for receiving said control signals and a plurality of output leads connected to said peripheral circuit input leads;

a readout multiplexor having a plurality of inputs separable into an even parity group including inputs corresponding to binary numbers having an even parity and an odd parity group including inputs corresponding to binary numbers having an odd parity, one of said parity group inputs being connected to said address demultiplexor output leads and the other of said parity group inputs being connected to said peripheral circuit output leads; and means for applying address signals from said control circuit to said multiplexor indicating the address of a particular peripheral circuit and having a parity dependent on the function to be performed at said particular peripheral circuit.

8. The combination of claim 7 further comprising a parity check circuit responsive to said address and control signals from said control circuit for determining the parity thereof; and comparison means controlled by the output of said parity check circuit, said comparison means having an input for receiving said control signals and an input connected to the output of said multiplexor.

9. For use in an automatic control system having a plurality of controlled devices, each of said devices producing information indicating the status thereof, and controlling circuit for generating address and data commands and for receiving said information and an interface unit connected between said circuit and said devices having a demultiplexor selectively controlled by said commands to generate drive signals for controlling one of said devices, a multiplexor having an output and a plurality of inputs corresponding to binary members having even and odd parity and an error checking comparator, connected to said controlling circuit to receive said data command;

a monitor circuit for ascertaining the operational status of said unit said monitor circuit comprising;

means connecting a first group of said plurality of multiplexor inputs corresponding to binary numbers of one parity to said demultiplexor to receive said drive signals;

means connecting a second group of said plurality of multiplexor inputs corresponding to binary numbers of the other parity to said devices to receive said information;

means responsive to said address commands for determining the binary parity thereof; and means for gating said multiplexor output to said comparator when said address command parity is the same as the parity of the multiplexor inputs in said first group.

10. A monitor circuit according to claim 9 further comprising means controlled by said determining means for gating the output of said multiplexor to said controlling circuit when said address command parity is the same as the parity of the multiplexor inputs in said second group.

* * * * *

UNITED STATES PATENT AND TRADEMARK OFFICE

CERTIFICATE OF CORRECTION

PATENT NO. : 3,992,696

DATED : November 16, 1976

INVENTOR(S) : Allen D. Fergeson

It is certified that error appears in the above-identified patent and that said Letters Patent are hereby corrected as shown below:

Column 9, line 34, "multiplexor", second occurrence, should read --demultiplexor--. Column 10, line 35, "and", first occurrence, should read --a--.

Signed and Sealed this

Twenty-second Day of March 1977

[SEAL]

*Attest:*

RUTH C. MASON
*Attesting Officer*

C. MARSHALL DANN
*Commissioner of Patents and Trademarks*